United States Patent [19]

DeFrancesco et al.

[11] Patent Number: 5,526,460
[45] Date of Patent: Jun. 11, 1996

[54] IMPACT WRENCH HAVING SPEED CONTROL CIRCUIT

[75] Inventors: Angelo J. DeFrancesco, Glen Ellyn, Ill.; Daniel M. Elligson, Millers; Michael P. Kunz, Hampstead, both of Md.

[73] Assignee: Black & Decker Inc., Newark, Del.

[21] Appl. No.: 232,559

[22] Filed: Apr. 25, 1994

[51] Int. Cl.[6] .......................................................... H02P 7/29
[52] U.S. Cl. ........................... 388/831; 318/257; 318/268
[58] Field of Search ...................................... 388/825, 826, 388/827, 828, 829, 830, 831, 838, 839; 318/434, 256, 257, 258, 268, 269, 289, 293, 379

[56] References Cited

U.S. PATENT DOCUMENTS

| | | |
|---|---|---|
| 3,665,493 | 5/1972 | Glowzewski et al. . |
| 3,710,213 | 1/1973 | Hansen . |
| 3,854,079 | 12/1974 | Brown . |
| 3,875,486 | 4/1975 | Barton . |
| 4,118,614 | 10/1978 | Leibundgut . |
| 4,233,549 | 11/1980 | Dighe . |
| 4,412,158 | 10/1983 | Jefferson et al. . |
| 4,458,186 | 7/1984 | Kuriyama et al. . |
| 4,588,910 | 5/1986 | Bausch . |
| 4,636,961 | 1/1987 | Bauer . |
| 4,734,629 | 3/1988 | Lessig, III et al. . |
| 4,841,165 | 6/1989 | Bowles . |
| 4,856,078 | 8/1989 | Konopka . |
| 4,998,589 | 3/1991 | Wiesendanger . |
| 5,014,793 | 5/1991 | Germanton et al. . |
| 5,015,928 | 5/1991 | Yang . |
| 5,254,913 | 10/1993 | Yang . |
| 5,399,948 | 3/1995 | Yang . |
| 5,414,793 | 5/1995 | Morikawa . |

FOREIGN PATENT DOCUMENTS

| | | |
|---|---|---|
| 0076039 | 4/1983 | European Pat. Off. . |
| 0633095A1 | 1/1995 | European Pat. Off. . |
| 3103286A.1 | 8/1982 | Germany . |
| 2217480 | 10/1989 | United Kingdom . |
| WO93/14559 | 7/1993 | WIPO . |

OTHER PUBLICATIONS

Copy of Abstract for JP 4 208 097; published 29 Jul. 1992 (Appln. No. JP 900 339 031, Appln. date 30 Nov. 1990).

*Primary Examiner*—Bentsu Ro
*Attorney, Agent, or Firm*—Harness, Dickey & Pierce

[57] ABSTRACT

An impact wrench having a speed limiting control circuit to allow an operator of the wrench to controllably limit the maximum speed of the wrench to a predetermined value when a trigger thereof is fully engaged. The impact wrench includes a manually adjustable speed limiting control protruding from an outer surface of the impact wrench which is conveniently manually adjustable. The speed limiting control is coupled to the wiper arm of a speed limiting potentiometer which is electrically coupled to a speed control circuit within the impact wrench. The speed limiting potentiometer limits the maximum speed of the motor of the impact wrench (and thus the maximum torque which can be generated by the impact wrench 10) to an operator selected percentage of the maximum motor speed which would otherwise be produced when the trigger is fully engaged. In the preferred embodiment the speed limiting potentiometer is electrically coupled in series between a capacitor and speed control potentiometer, which are each coupled to a 555 CMOS timer which controls the duty cycle of an FET used to drive the motor. The speed limiting potentiometer enables the operator to further limit the maximum duty cycle of the output of the timer, which is a pulse-width-modulated like output, to a percentage of that which would otherwise be produced when the trigger is fully engaged.

11 Claims, 2 Drawing Sheets

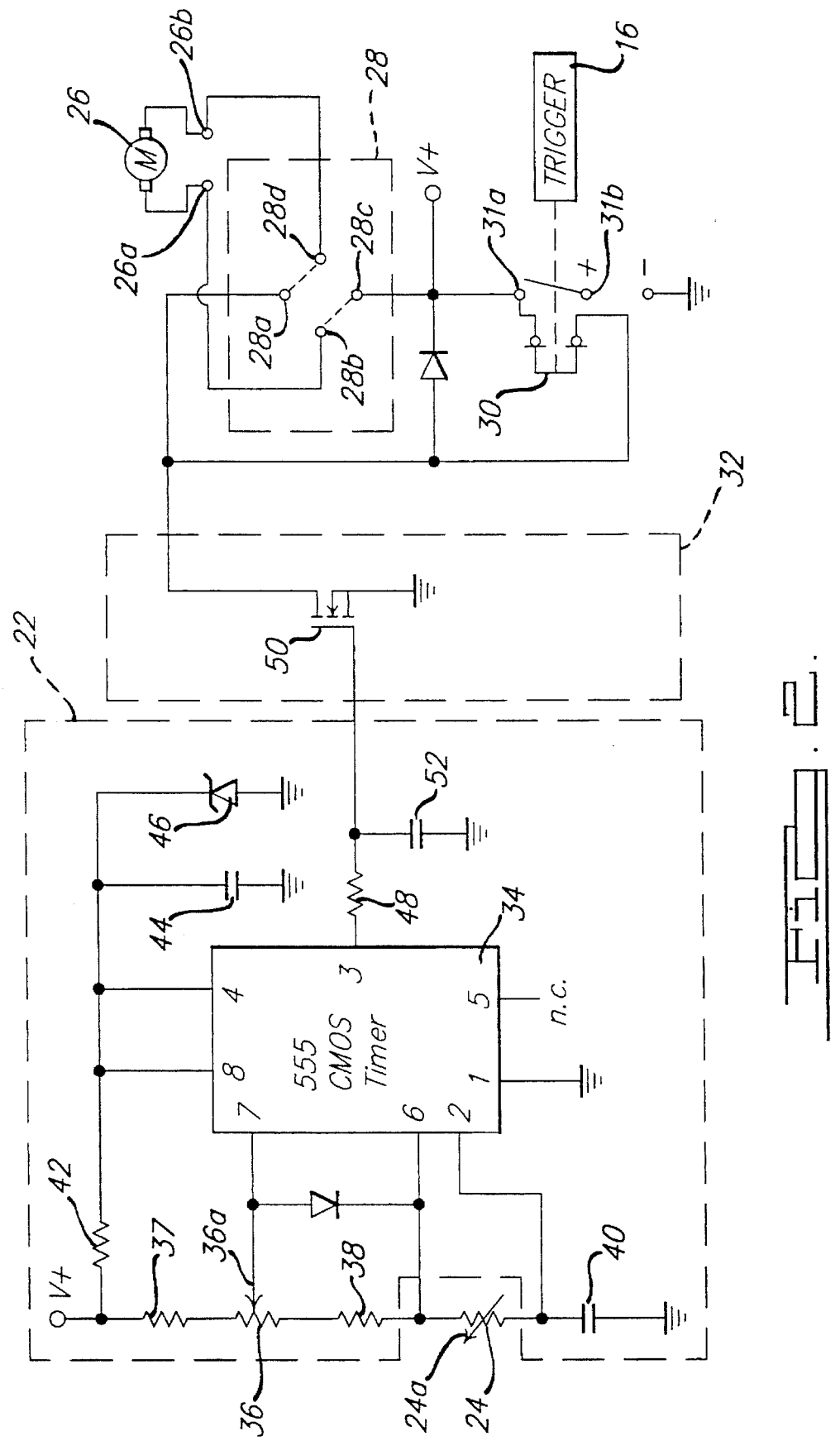

IMPACT WRENCH HAVING SPEED CONTROL CIRCUIT

BACKGROUND OF THE INVENTION

1. Technical Field

This invention relates to electrical impact wrenches, and more particularly to an electrical, variable speed impact wrench having an operator settable maximum speed control for enabling the operator to controllably limit the maximum speed, and thus the maximum torque, of the wrench.

2. Discussion

Impact wrenches are used in a wide variety of applications to quickly secure various forms of fasteners such as threaded screws and the like to a work surface. Such impact wrenches typically include an operator-engageable trigger which is electrically coupled to a speed control circuit disposed within a housing of the impact wrench. The speed control circuit is in turn electrically coupled to a motor of the impact wrench and provides a variable voltage drive signal to the motor in accordance with the degree of engagement of the trigger by the operator. In this manner the speed of the motor, and thus the torque which is applied by the motor to drive a threaded screw or other like fastener, can be controlled by the operator simply by varying the degree of engagement of the trigger.

While prior designs of impact wrenches such as that described above have proven to be successful and valuable tools for rapidly driving various forms of fasteners, one limitation has been the ease with which the operator can inadvertently engage the trigger to an excessive degree to cause the impact wrench to drive a fastener too quickly into engagement with the work surface. In such instances the unnecessarily high speed motor of the wrench causes an unnecessarily high torque to be applied to the fastener which sometimes results in breakage of the fastener as the fastener is driven into fully seated engagement with the work surface. Experienced operators of such impact wrenches may be able to exercise a degree of manual control over the trigger of the impact wrench so as to avoid or limit such breakage due to driving the fastener at too high a speed, but infrequent users frequently have difficulty consistently controlling the maximum speed of the wrench, via the trigger, so as to avoid excessive breakage of fasteners.

SUMMARY OF THE INVENTION

It is thus a principal object of the present invention to provide a speed limiting circuit for an electrically driven impact wrench which provides the operator of the wrench the capability of setting a maximum speed at which the wrench may be operated, and thus limiting the maximum torque that can be applied by the wrench, when the trigger of the wrench is fully engaged.

It is yet another object of the present invention to provide an electrically driven impact wrench having a speed limiting circuit which may be easily and inexpensively added to further control a speed control circuit within the wrench, and which includes an operator accessible switch which may be readily adjusted by the operator prior to using the wrench to limit the speed of the wrench to a desired percentage of the maximum motor speed regardless of the degree of engagement of a trigger of the wrench by the operator.

It is yet another object of the present invention to provide an electrically driven impact wrench having an operator settable speed limiting circuit which does not appreciably increase the cost of manufacture of the wrench, and further which does not significantly increase the complexity of the wrench or its assembly.

The above and other objects are provided by an electrically driven impact wrench in accordance with a preferred embodiment of the present invention. The impact wrench of the present invention incorporates an operator settable speed limiting control for enabling the operator to limit the maximum speed at which the wrench may be operated to a desired percentage of the maximum motor speed, regardless of the degree of engagement of a trigger of the wrench during use.

In the preferred embodiment the impact wrench includes a speed control circuit for controlling the speed of the motor of the wrench. The speed control circuit is electrically responsive to the degree of engagement of the trigger such that the greater the degree of engagement of the trigger by the operator the greater the speed at which the motor is driven by the speed control circuit. The speed control circuit is further electrically responsive to an operator settable speed control limiting circuit having an operator adjustable speed limiting control readily accessible by the operator without any disassembly of the wrench. The operator accessible speed limiting control enables the operator to limit the maximum motor speed at which the wrench may be operated to a desired percentage of full motor speed when the trigger is fully engaged. Accordingly, if during use the operator engages the trigger completely, which would otherwise cause an excessive motor speed to be produced for the type of fastener being driven, the speed control limiting circuit causes the motor speed to be limited to the operator adjusted percentage of the maximum motor speed, thus limiting the torque applied by the wrench.

Thus, even inexperienced and/or infrequent users are capable of using the impact wrench of the present invention with a variety of fasteners without the disadvantage of frequently overdriving a fastener and breaking it due to momentarily excessive engagement of the trigger, and thus momentarily excessive motor speed and resulting torque.

In the preferred embodiments of the present invention a timer circuit, and preferably a conventional CMOS timer circuit, is used as the motor speed control circuit. It will be appreciated, however, that a bipolar transistor timer could also be used in lieu of a CMOS timer.

The CMOS timer circuit generates a pulse-width-modulated like voltage drive signal and is electrically responsive to the trigger of the impact wrench such that the duty cycle of the voltage drive signal is variable in response to the degree of engagement of the trigger. The speed control limiting circuit comprises a potentiometer which is readily manually adjustable by the operator. The potentiometer operates to limit the maximum duty cycle of the voltage drive signal from the CMOS timer circuit to cause the motor speed to be limited to a predetermined percentage of its maximum speed. Thus, for example, if the speed control limiting circuit is adjusted by the operator to limit the motor speed to 75 percent of the maximum motor speed, the motor speed, and thus the torque generated by the motor, will be limited to this percentage when the trigger of the wrench is engaged completely by the operator during use. Thus, there is little or no chance of the operator "over-driving" a fastener, and thus breaking the fastener, by inadvertently and momentarily applying too much pressure to the trigger of the wrench during use.

The apparatus of the present invention provides an impact wrench having a uniquely simple and relatively inexpensive means by which the maximum speed of the motor of the wrench may be controllably limited by the operator without adding significant cost or complexity to the impact wrench.

BRIEF DESCRIPTION OF THE DRAWINGS

The various advantages of the present invention will become apparent to one skilled in the art by reading the following specification and subjoined claims and by referencing the following drawings in which:

FIG. 2 is an electrical schematic diagram of the speed control circuit and the speed control limiting potentiometer of the present invention, and also showing the motor, the motor brake switch and motor connection terminals in electrical schematic form.

DETAILED DESCRIPTION OF THE PREFERRED EMBODIMENT

Figure 1:
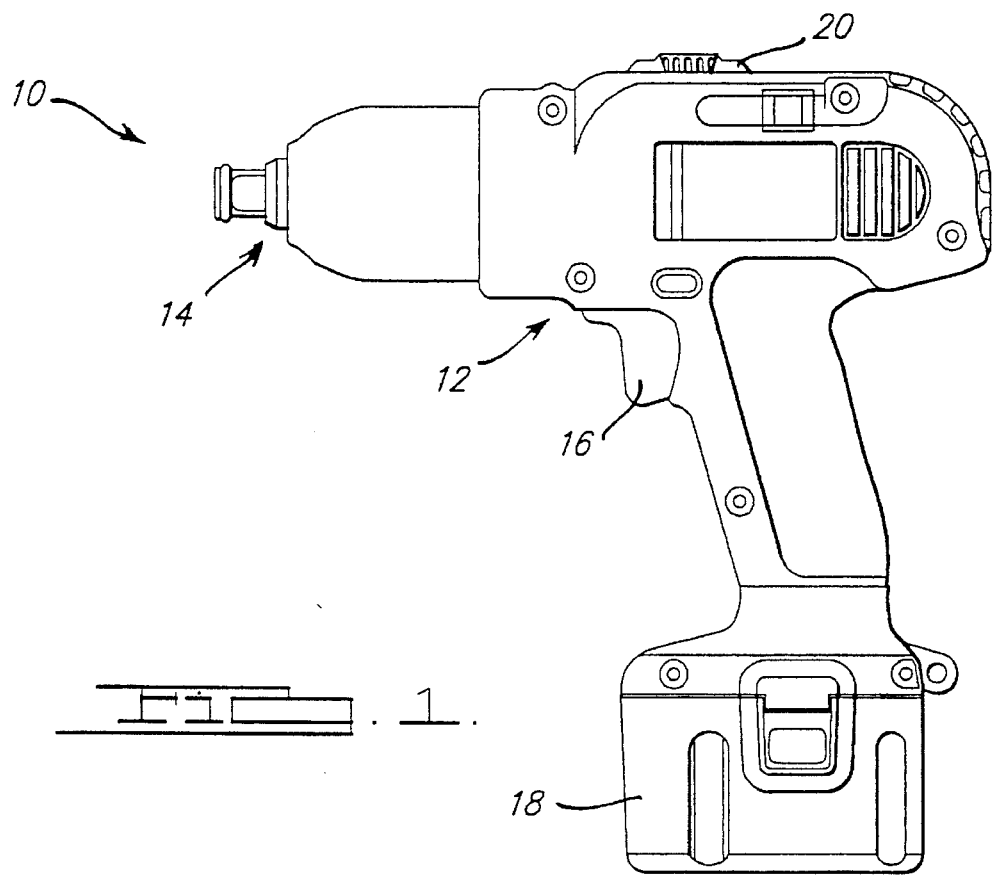
FIG. 1 is a side view of an impact wrench in accordance with the preferred embodiment of the present invention.

Referring to FIG. 1, an electrically driven impact wrench 10 in accordance with a preferred embodiment of the present invention is shown. The impact wrench 10 includes a housing 12 which includes a motor (not shown) and a speed control circuit, which will be discussed momentarily in connection with FIG. 2. The motor is mechanically coupled to a tool bit holder 14 via a suitable, conventional gear reduction system and impacting mechanism (not shown). The speed control circuit is also electrically coupled to a manually engageable trigger 16. As the operator squeezes the trigger 16, the motor speed is increased generally linearly in accordance with the degree to which the operator squeezes and holds the trigger 16 engaged. Accordingly, when the operator engages and holds the trigger to a point about half way between the fully released position and the fully engaged position, the motor speed control circuit causes a voltage drive signal to be applied to the motor which causes the motor to be driven at a speed which is approximately 50% of its maximum speed. Full engagement of the trigger 16 causes a maximum voltage drive signal to be applied to the motor which causes the motor to be driven at its maximum rotational speed.

With further reference to FIG. 1, a rechargeable battery pack 18 is included for powering the motor. It will be appreciated, however, that while the impact wrench 10 of the present invention has been illustrated as being a battery powered impact wrench, that the impact wrench 10 could easily be adapted with minor modifications for use with an A/C power source.

The impact wrench 10 of FIG. 1 further includes a rotatable speed limiting control 20 which is mechanically coupled to the speed limiting control circuit disposed within the housing 12. The speed limiting control 20 may be easily and conveniently adjusted by the operator with a single hand to limit the maximum speed of the motor, and thus the maximum torque generated by the motor, as will be described in more detail in connection with FIG. 2. Once set in a certain position, however, the speed limiting control 20 remains at that position until the operator readjusts it.

In the preferred embodiment the impact wrench 10 includes suitable indicia on the housing 12 closely adjacent the speed limiting control 20 to provide an immediate visual indication of the degree of speed reduction that a given setting of the control 20 provides. This indicia may correspond to percentages (i.e., 25%, 50%, etc.) of the maximum motor speed, single digits (e.g., "1" through "5") denoting various levels of maximum motor speed, or virtually any other designation which readily identifies the degree of speed reduction that a given setting of the speed limiting control 20 provides. It will also be appreciated that while the control 20 has been illustrated in FIG. 1 as being on a top portion of the housing 12, that it could be disposed at other locations on the housing 12, such as a side portion, if so desired.

Referring now to FIG. 2, an electrical circuit diagram is shown illustrating the speed control circuit, which is denoted by reference numeral 22, in electrical communication with a speed limiting circuit 24 of the present invention. Also shown is the motor, designated by reference numeral 26, and a directional switch 28 for reversing direction of the motor 26. The trigger 16 has also been illustrated in simplified form and shown as coupled to a brake contact switch 30 for braking the motor 26 when the trigger 16 is completely released by the operator. Finally, a field effect transistor (FET) 32 is shown electrically coupled to the speed control circuit 22 and also to the motor directional switch 28.

With further reference to FIG. 2, the speed control circuit 22 comprises a timer circuit 34 which, in the preferred embodiment, is represented by a 555 CMOS timer circuit. Pin 7 of this circuit is a DISCHARGE input which is electrically coupled to the wiper arm 36a of a speed control potentiometer 36. The wiper arm 36a is also mechanically coupled to the trigger 16 such that engagement of the trigger 16 causes a corresponding movement of the wiper arm 36a. The potentiometer 36 is also coupled to supply voltage (V+) through a resistor 37. Pin 6 of the CMOS timer circuit 34 is a THRESHOLD input to an internal comparator of the circuit which is coupled to one side of the speed control limiting circuit 24 and a resistor 38. In the preferred embodiments the speed control limiting circuit 24 is comprised of a potentiometer having its wiper arm 24a coupled to the speed limiting control 20 (FIG. 1). Thus, rotational movement of the control 20 causes a corresponding movement of the wiper arm 24a of the potentiometer 24.

With further reference to FIG. 2, pin 2 of the timer circuit 34 is coupled to the opposite side of the potentiometer 24 and to a capacitor 40. Pin 8 of the timer circuit 34 is coupled through a resistor 42 to the supply voltage (V+). Pin 4 is a RESET input which is coupled to a capacitor 44, a zener diode 46, and also to the resistor 42. The zener diode 46 provides protection to the timer circuit 34 in the event of a voltage transient and limits the supply voltage to a predetermined level, which in the preferred embodiment is about 9.1 vdc. Pin 3 of the timer circuit 34 is coupled to a resistor 48, which is in turn coupled to the gate 50 of the FET 32 and also to a capacitor 52.

With further reference to FIG. 1, the timer circuit 34 is controlled by the charging and discharging cycles of the capacitor 40, the charging cycle of which is affected by the settings of the speed limiting potentiometer 24 and the speed control potentiometer 36. When the capacitor 40 is discharged below to a value of approximately 33% of the supply voltage (V+), the input to pin 2 of the timer circuit 34 will cause the internal comparator to generate a high level logic signal output at pin 3 which is applied to the gate 50 of the FET 32. This causes the FET 32 to be turned on. When the capacitor 40 charges to a value which exceeds 66% of the supply voltage (V+), a second internal comparator of the timer circuit 34 causes the output at pin 3 to go to a logic low level signal, which in turn causes the FET 32 to be turned off. Simultaneously, an internal discharge transistor of the timer circuit 34 is turned on which couples pin 7 (DISCHARGE) to ground. The capacitor 40 then discharges through the potentiometers 24 and 36, the resistor 38 and pin 7 of the timer circuit 34. The resulting output at pin 3 of the timer circuit 34 is a rectangular-wave output signal. Assuming the speed limiting potentiometer 24 is set to its minimum resistance (approximately zero ohms), varying the resistance of the speed control potentiometer 36 thus increases or decreases the discharging time for the capacitor 40. This in turn varies the duration during which the signal from pin 3 of the timer circuit 34 is at a logic high level and consequently controls the duty cycle of the FET 32. The duty cycle, in turn, determines the "average" power applied to the motor 26. Thus, if the potentiometer 24 is set to provide its minimum resistance, the capacitor 40 will be discharged most rapidly. This in turn causes the output at pin 3 to more quickly reach the 33% plateau at which the timer circuit 34 turns on the FET 32. Conversely, setting the speed control potentiometer 36 to its maximum resistance value (i.e., letting the trigger 16 almost completely out) causes the capacitor 40 to discharge at its slowest rate. This causes the output at pin 3 of the timer circuit 34 to be held at a logic low level for the greatest time period in a given cycle. Thus, by merely varying the resistance provided by the speed control potentiometer 36, the RC time constant formed by the potentiometer 36 and the capacitor 40 can be controlled to vary the duty cycle of the FET 32.

By the addition of the speed limiting potentiometer 24 in series with the capacitor 40 and speed control potentiometer 36, the discharging time of the capacitor 40 can be further controlled to limit the maximum duty cycle of the FET 32, and thus the maximum average voltage applied to the motor 26 to a user defined percentage of the maximum voltage capable of being applied to the motor 26. When the speed limiting potentiometer 24 is set to provide some value of additional resistance, the RC time constant will be lengthened. The capacitor 40 will therefore discharge at a slower rate than it would otherwise discharge at for any given setting of the speed control potentiometer 36, thus further limiting the maximum duty cycle of the FET 32, and thus the maximum average voltage applied to the motor 26. When the speed limiting potentiometer 24 is set to its minimum resistance value (approximately zero ohms), it will have virtually no affect on the discharging time of the capacitor 40, and thus no affect on the duty cycle of the FET 32. In this instance the duty cycle of the FET 32 is controlled entirely by the setting of the speed control potentiometer 36 through engagement of the trigger 16.

Thus, the speed limiting potentiometer 24 allows the operator to controllably limit the maximum duty cycle of the FET 32, and thus the maximum average voltage applied to the motor 26. This in turn limits the maximum torque which the motor 26 produces when the trigger 16 is fully engaged to a corresponding percentage of the maximum torque that would otherwise be produced by the motor 16 with full engagement of the trigger 16.

With further reference to FIGS. 1 and 2, the overall operation of the impact wrench 10 will now be described. Initially, the operator sets the speed limiting control 20 to a desired position corresponding to the percentage of the maximum motor speed which he desires to limit the impact wrench 10 to. As an example, it will be assumed that the speed limiting control 20 has been set to 75% of the maximum motor speed. When the operator begins to engage the trigger 16, the brake contact switch 30 is immediately opened and power contacts 31a and 31b are electrically coupled. Simultaneously, the wiper 36a of the potentiometer 36 is adjusted as the capacitor 40 begins to charge in series through resistors 37 and 38 and the potentiometers 36 and 24. This in turn causes a pulse-width-modulated like output signal to be generated at pin 3 (OUTPUT) of the timer circuit 34 having a duty cycle in accordance with the trigger 16 position, and being further limited by the setting of the speed limiting potentiometer 24, which turns on the FET 32. This causes a pulse-width-modulated like dc voltage to be applied across the motor terminals 26a and 26b of the motor 26 to drive the motor 26. When the forward/reverse switch is set in the forward position, for example, terminals 28a and 28d will be electrically coupled and output terminals 28b and 28c will be electrically coupled. If the forward/reverse switch 28 is moved to the reverse switch, then the terminals 28a and 28b will be electrically coupled and terminals 28c and 28d will be electrically coupled. Thus, the direction of current flow through the motor 26 can be controlled to cause forward and reverse operation of the motor 26.

With continued reference to FIG. 2, since the speed limiting potentiometer 24 has been set via the speed limiting control 20 to approximately 75% of the maximum motor speed, the maximum duty cycle of the FET 32 is reduced by about 25%. Thus, when the trigger 16 is fully engaged, the maximum motor speed, and thus the maximum torque applied by the motor 26, will be reduced by about 25%.

It will be appreciated that the claims appended hereto are not limited to pulse-width-modulated control in its strictest sense, where the frequency of the rectangular wave signal would not vary. Accordingly, any form of speed control circuit which produces a pulse-width-modulated like signal which may vary in frequency, but which still provides a controllably variable duty cycle is contemplated as being within the scope of the appended claims.

Figure 3:
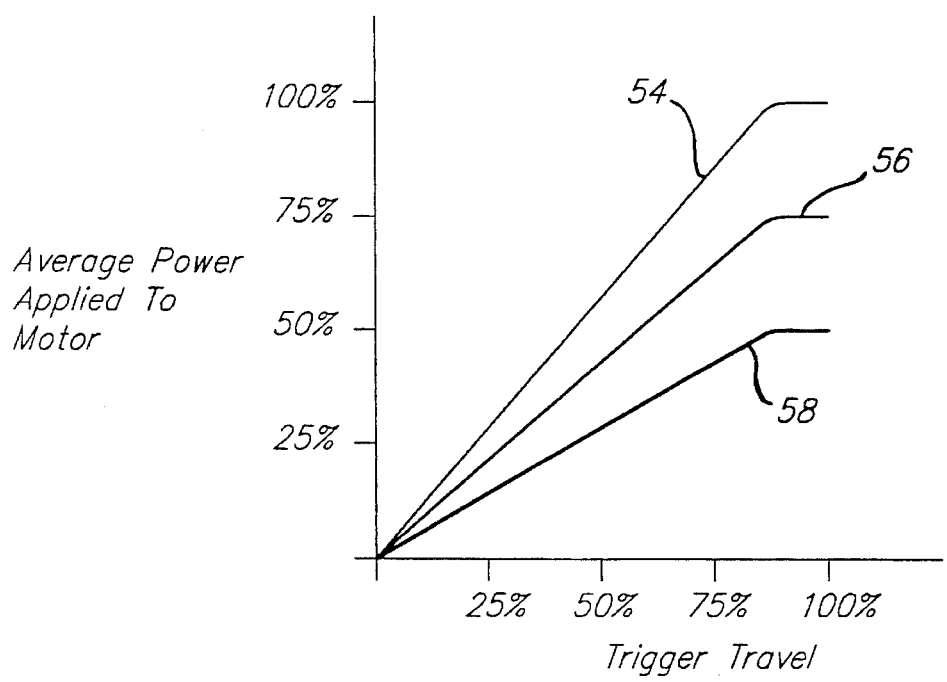
FIG. 3 is a graph showing several curves of the power applied to the motor for various settings of the speed limiting control.

Referring briefly to FIG. 3, graphs of several curves illustrating the affect of the speed limiting potentiometer 24 are shown. As shown by waveform 54, the average dc voltage applied to the motor 26, and thus the average power applied to the motor 26, increases generally linearly in relation to the degree of trigger 16 engagement to a maximum value when the speed limiting potentiometer 24 is set to essentially zero ohms. As shown by waveform 56, the average power increases generally linearly in accordance with engagement of the trigger to a point of about 75% of its maximum value when the speed limiting potentiometer 24 has been set to about 75% of maximum motor speed. Further adjustment of the speed limiting potentiometer via control 20 to about 50% of maximum motor speed causes the power applied to the motor 26 to be limited, at full trigger 16 engagement, to about 50% of the maximum power. With each of the curves 54–58 it will be noted that due to the mechanics of the trigger switch 16, the maximum motor speed, and thus maximum power, is reached slightly before 100% engagement of the trigger switch 16.

Accordingly, the speed control limiting potentiometer 24 provides a simple, inexpensive, yet effective means for enabling a user of the impact wrench 10 to quickly and easily limit the maximum motor speed, and thus the maximum torque, which can be produced by the impact wrench 10 to avoid inadvertently breaking fasteners during use of the impact wrench 10. The speed control limiting potentiometer 24 thus allows individuals with limited experience in using impact wrenches, or individuals who do not use impact wrenches regularly enough to develop the necessary "feel" for operating the trigger 16 to avoid breaking fasteners, to still use the tool 10 conveniently without over tightening fasteners to a degree which causes breakage. The speed limiting control potentiometer 24 of the present invention can further be implemented with a minimum degree of expense in circuit modifications to many existing forms of speed control circuits without adding appreciably to the overall cost of the impact wrench or to the complexity of its assembly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A variable speed impact wrench having an operator settable maximum speed control to limit the maximum torque applied to a tool bit holder of the wrench, said impact wrench comprising:

a motor for driving the tool bit holder;

a speed control circuit for controlling the speed of said motor;

a trigger engageable by an operator, said trigger being operably coupled to said speed control circuit to allow said operator to generate a speed control signal in relation to the degree of actuation of said trigger;

a speed limiting device electrically communicating with said speed control circuit and manually adjustable by said operator for enabling said operator to electrically limit a maximum speed at which said motor can be driven when said trigger is fully engaged.

2. The impact wrench of claim 1, wherein said speed limiting device for adjusting the maximum speed of said motor comprises a speed limiting potentiometer for limiting a maximum voltage which may be applied to said motor.

3. The impact wrench of claim 2, further comprising a battery pack releasably securable to said impact wrench for powering said motor.

4. The impact wrench of claim 1, wherein said speed control circuit comprises a 555 CMOS timer.

5. A variable speed electric impact wrench having an operator engageable trigger for permitting the operator to vary the speed of the impact wrench in accordance with the degree of engagement of the trigger, a maximum speed limiting control for allowing the operator to set a maximum speed at which a motor of the wrench may be driven regardless of the degree of engagement of the trigger, said impact wrench comprising:

a variable speed circuit operably associated with said trigger to produce a motor drive signal for driving said motor of said impact wrench at a speed in proportion to the degree of engagement of said trigger up to a maximum speed when said trigger is fully engaged; and a speed limiting device adjustable by said operator and in electrical communication with said variable speed circuit, for enabling said operator to limit said motor drive signal to a maximum value, to thereby limit said motor speed to a speed less than said maximum speed when said trigger is fully engaged by said operator.

6. The impact wrench of claim 5, wherein said speed limiting device comprises a potentiometer manually adjustable by said operator.

7. The impact wrench of claim 5, wherein said variable speed circuit generates a pulse-width-modulated like motor drive signal; and wherein operator adjustment of said speed limiting device operates to limit a duty cycle of said pulse-width-modulated like motor drive signal to said maximum value, to thereby limit operation of said motor to said speed which is less than said maximum speed.

8. A variable speed impact wrench comprising:

a tool bit holder;

a motor for driving said tool bit holder rotationally;

a speed control circuit including a speed control potentiometer, for generating a pulse width modulated like motor drive signal having a controllably variable duty cycle for driving said motor;

an operator engageable trigger for allowing a user to control said duty cycle, and therefore the speed of said motor; and a speed limiting potentiometer manually adjustable by said user and operably coupled to said speed control circuit for enabling said user to limit said duty cycle to a desired percentage of a maximum value when said trigger is in a fully engaged position.

9. The impact wrench of claim 8, further comprising a releasably coupled, rechargeable battery pack for powering said motor.

10. The impact wrench of claim 8, wherein said speed control circuit comprises:

a CMOS timer circuit;

said speed control potentiometer mechanically coupled to said trigger and electrically coupled to said CMOS timer circuit; and a capacitor; and wherein an RC time constant provided by said speed control potentiometer and said capacitor is further modified by the resistance provided by said speed limiting potentiometer to thereby controllably limit said duty cycle.

11. A variable speed impact wrench comprising:

a tool bit holder;

a motor for driving said tool bit holder rotationally;

a speed control circuit comprising a CMOS timer circuit, a speed control potentiometer mechanically coupled to an operator engageable trigger and electrically coupled to said CMOS timer circuit, and a capacitor, for generating a pulse width modulated like motor drive signal having a controllably variable duty cycle for driving said motor;

said operator engageable trigger for allowing the user to control said duty cycle, and therefore the speed of said motor; and a speed limiting potentiometer manually adjustable by said user and operably coupled to said speed control circuit for providing resistance to an RC time constant provided by said speed control potentiometer and said capacitor to controllably limit said duty cycle to a desired percentage of a maximum value when said trigger is in a fully engaged position.

* * * * *